(12) United States Patent
Huff, II et al.

(10) Patent No.: US 9,218,179 B2
(45) Date of Patent: Dec. 22, 2015

(54) SOFTWARE AUTOMATED DATA AND DATA MODEL UPGRADE SYSTEM

(75) Inventors: Max Ray Huff, II, Fort Collins, CO (US); Gary Lewis Poole, Fort Collins, CO (US); Douglas Robert Borg, Fort Collins, CO (US); Thomas Guenter Bartz, Loveland, CO (US)

(73) Assignee: Integware, Inc., Fort Collins, CO (US)

( * ) Notice: Subject to any disclaimer, the term of this patent is extended or adjusted under 35 U.S.C. 154(b) by 1 day.

(21) Appl. No.: 14/241,425

(22) PCT Filed: Jul. 12, 2012

(86) PCT No.: PCT/US2012/046558
§ 371 (c)(1),
(2), (4) Date: Feb. 26, 2014

(87) PCT Pub. No.: WO2013/012690
PCT Pub. Date: Jan. 24, 2013

(65) Prior Publication Data
US 2014/0304694 A1 Oct. 9, 2014

Related U.S. Application Data

(60) Provisional application No. 61/572,418, filed on Jul. 15, 2011.

(51) Int. Cl.
*G06F 9/44* (2006.01)
*G06F 9/445* (2006.01)

(52) U.S. Cl.
CPC ... *G06F 8/65* (2013.01); *G06F 8/68* (2013.01)

(58) Field of Classification Search
CPC .................................. G06F 8/65; G06F 8/68
USPC .................................................. 717/168–178
See application file for complete search history.

(56) References Cited

U.S. PATENT DOCUMENTS

| | | | |
|---|---|---|---|
| 7,313,577 B2 * | 12/2007 | Peng | |
| 7,610,298 B2 | 10/2009 | Zaytsev et al. | |
| 7,991,742 B2 | 8/2011 | Li et al. | |
| 8,489,543 B2 * | 7/2013 | Taylor et al. | 707/601 |
| 2005/0055686 A1 * | 3/2005 | Buban et al. | 717/170 |
| 2005/0071345 A1 * | 3/2005 | Lin | 707/100 |
| 2005/0071359 A1 | 3/2005 | Elandassery et al. | |
| 2007/0006217 A1 * | 1/2007 | Tammana | 717/174 |
| 2009/0198727 A1 | 8/2009 | Duan et al. | |
| 2009/0307650 A1 * | 12/2009 | Saraf et al. | 717/101 |
| 2010/0088351 A1 * | 4/2010 | Dehmann et al. | 707/803 |
| 2010/0299653 A1 * | 11/2010 | Iyer et al. | 717/121 |
| 2011/0167418 A1 | 7/2011 | Gopal et al. | |

OTHER PUBLICATIONS

U.S. Appl. No. 61/572,418, filed Jul. 15, 2011.
PCT Interantional Patent Application No. PCT/US2012/046558, filed Jul. 12, 2012.

* cited by examiner

*Primary Examiner* — Qing Chen
(74) *Attorney, Agent, or Firm* — Craig R. Miles; CR Miles, P.C.

(57) ABSTRACT

A set of software upgrade tools that perform automated software data model and data upgrades to a first software data model already having customizations to produce a target software data model which includes updates included in a second software data model without loss of the customizations made to the first software data model.

14 Claims, 9 Drawing Sheets

SOFTWARE AUTOMATED DATA AND DATA MODEL UPGRADE SYSTEM

This application is the United States National Stage of International Patent Cooperation Treaty Patent Application No. PCT/US2012/046558, filed Jul. 12, 2012, which claims the benefit of U.S. Provisional Patent Application No. 61/572,418, filed Jul. 15, 2011, each hereby incorporated by reference herein.

I. TECHNICAL FIELD

A computer system for upgrading a first software data model and data which may include customizations to produce a target software data model which includes updates included in a second software data model without loss of the customizations made to the first software data model.

II. BACKGROUND

In general, support of automated (or programmed) upgrades from one version of a software product to the next is a well-known and often-practiced activity. In performing upgrades of a software product, both the software data model and associated data require updating.

The data model of a product refers to the underlying structure and modeling of customer data. The data model includes type (or class) definitions, allowed relationships among types, policies for accessing, creating, modifying and deleting customer data, object state definitions and allowed state transitions, and actions which can take place. In other words, the data model defines the rules by which application data can be created, represented, modified, and acted upon.

The ability to automate upgrades depends on the degree of stability of a product's data model. Challenges in performing an upgrade are introduced if key elements of a product's data model change between versions. If a products data model changes with an upgrade, the installer for the new version must apply those changes to the data model and data of the earlier version of the product. A transformation is required—not only to the new data model, but also of the customer's existing data so that it can be consistent with the new structure expected by the new version of the software.

Conventionally, such data model and data transformation has often been handled explicitly through a series of programmed steps, written manually by a developer in a script or programming language, and may be incorporated into an upgrade installer. Manual development of software to handle this has been used because it has been assumed that automation is too difficult to justify the effort since the required changes are different for each customer-specific release. However, manually writing such code is often a tedious and time-consuming process.

In some aspects of the conventional arts, tools have been developed to analyze and display the differences in two versions of a data model (corresponding to two different product releases.) However, the majority of these tools are limited to identifying and presenting information; no command or other executable output may be generated for migrating one representation of the data model (and corresponding data) to another. An example is described by United States Patent Publication No. 2009/0307650 A1 which performs analysis and presents the results, but does not act on those results.

Other aspects of conventional arts have taken the next step of execution in order to carry out a data model migration as part of an upgrade. An example is described by United States Publication No. 2009/0198727 A1 which utilizes a trace log of all changes that have taken place in an initial migration of a data model from one state to another. These recorded trace steps are then converted into a corresponding series of executable steps. These steps can then be used to repeatedly perform the exact same data model upgrade (for example, in an installation script) in repeated deployments.

Another example of an executable set of steps to perform a data model and data migration is provided through a Dassault Systemes S.A. tool provided with its Enovia platform referred to as "Spinner". Spinner may be used to load or dump data models from an application and can be used to view or modify its data model. It is typically used to install a data model into a system database. Additionally, it has a utility to compare two different data models and produce a list of differences (a "delta") between them. This delta can then be converted to a series of steps to migrate a data model from the original state to a desired target state.

Accordingly, conventional tools analyze (or record) the differences between data models and can produce executable output that can be used to align the data models. However, these conventional tools may be limited to working only from specific a priori states of the data model. That is, the data model from which a given upgrade takes place must exactly match a predefined state (for example, a specific previous version of a software product). This means the tools can fail if any custom changes have been made to the data model between upgrades. Custom changes to a data model put it (and its corresponding data) into a state that does not match the expected state of such an installation tool. Without a matching initial state, an upgrade can fail using these conventional tools.

Custom changes to the data model are not infrequent. Sometimes a vendor is involved in these customizations. If that that case, the vendor may have sufficiently accurate records of the custom changes to allow the vendor to perform an upgrade of data and the data model or the customer may be trained to make data model changes (also known as "schema changes") independent of the vendor. This significantly compounds the problem of performing upgrades due to the analysis that must be done to assess and document the state of the current data model, how the data model differs from the product's original data model, and how a path forward can be established. Consequently, upgrades of customized products are typically very costly in that an upgrade often requires a significant amount of manual software modification to accommodate the customizations that have been made to the data model.

Significant cost savings can be realized if an automated means of analyzing customizations to a data model can be performed. Still further cost savings can be realized if the analysis can be used to automate the migration of custom features to an upgraded product release by taking the custom data model into account.

III. DISCLOSURE OF INVENTION

Accordingly, a broad object of the invention can be to provide a set of tools that performs automated software data model and data upgrades to a first software data model (also referred to as the "original software data model") to include the upgrades (also referred to as "upgrade deltas") of a second software data model (also referred to as the "upgrade software data model") even when customizations (also referred to as "customization deltas") have been made to the first software data model to produce a customized software data model (also referred to as a "third software data model") to produce a target software data model without the loss of the customization deltas made to in producing the third software data model.

Another substantial object of the invention can be to provide a method of upgrading a customized software data model utilizing a three way comparison of the first software data model, the first software data model having customizations, and the second software data model to provide a target software data model having the upgrades of the second software data model and the customizations made to the first software data model.

Another substantial object of the invention can be to provide a method of ensuring that data migration aligns with the target software data model.

Another substantial object of the invention can be to provide a method of upgrading customized software data model which can be applied to each one of a plurality of separate layers of the customized software data model and in doing so involves comparisons across the first software data model and the customized software data model at each of a plurality of layers of the customized software data model and further assessing changes to dependencies the analyzed layer has on other separate layers.

Another substantial object of the invention can be to provide a method of uninstalling previously installed upgrades, even if customizations subsequently made to the upgraded version impact the upgraded data model.

Naturally, further objects of the invention are disclosed throughout other areas of the specification, drawings, photographs, and claims.

V. MODE(S) FOR CARRYING OUT THE INVENTION

Figure 1:
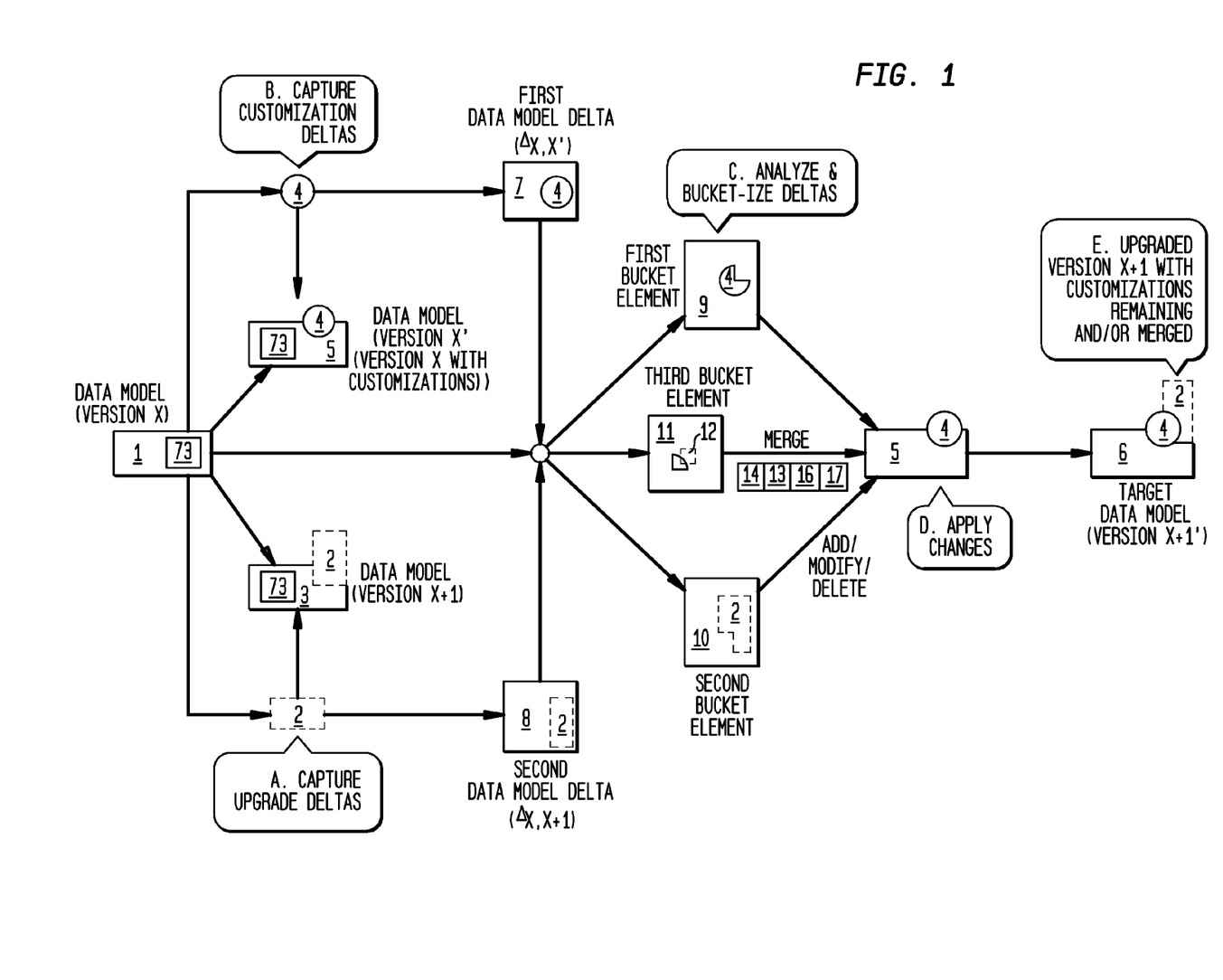
FIG. 1 is an illustration of a particular method of upgrading customized software data model to provide a target software data model.

Now referring primarily to FIG. 1, which provides an example of a method for upgrading a first software data model (1)(Version X) with upgrades (2)(also referred to as an "upgrade deltas") included in a second software data model (3)(Version X+1). The first software data model (1)(Version X) can include customizations (4)(also referred to as a "customization deltas") in the form of a third software data model (5) (Version X'). The term "upgrade deltas" for the purposes of this invention means schema differences between versions of a software data model released by the manufacturer. The term "customization deltas" for the purposes of this invention means schema differences applied to a version of a software data model which are not upgrade deltas. That is schema differences which are not included in a version of the software released by the manufacturer.

Embodiments of the method allow the first software data model (1) (Version X) or the third software data model (5) (Version X') to incorporate the upgrade deltas (2) provided by the second software data model (3)(Version X+1). The upgrade deltas (2) can be applied to the third software data model (5) (Version X') without loss of the customization deltas (4). Accordingly, a target software data model (6)(Version X+1') can be produced by the method which includes both the upgrade deltas (2) and the customization deltas (4).

To apply upgrade deltas (2) to a third software data model (5)(Version X') already including customization deltas (4), the first software data model (1)(Version X) can be compared to the third software data model (5)(Version X'), to analyze and record the customization deltas (4) made to the first software data model (1)(Version X). Similarly, the first software data model (1) (Version X) can be compared to the second software data model (3)(Version X+1) to analyze and record upgrade deltas (2). The comparisons result in a first data model delta (7)($\Delta$X, X') including all the customization deltas (4) made to the first software data model (1)(Version X) and a second data model delta (8)($\Delta$X, X+1) including all the upgrade deltas (2) to be made to the first software data model (1)(Version X).

A three-way comparison can then be made among the first software data model (1)(Version X) and the first data model delta (7) and the second data model delta (8)($\Delta$X, X+1). The comparison categorizes changes to the first software data model (1)(Version X) into one of three bucket elements (9) (10)(11). A first bucket element (9) which includes customization deltas (4) of the third software data model (5)(Version X') which are to be preserved and included in the target software data model (6) (Version X+1'). A second bucket element (10) in which upgrade deltas (2) (additions, modifications, deletions, or the like) included in the second software data model (3)(Version X+1) which are to be applied to the third software data model (5) (Version X') and included in the target software data model (6) (Version X+1'). A third bucket (11) which includes customization deltas (4) of the first data model delta (1) or upgrade deltas (2) of the second data model delta (3) that must be merged due to conflicts, overlaps, dependencies, or the like (also referred to as "merged deltas (12)", between the first data model delta (7) and the second data model delta (8).

Figure 2:
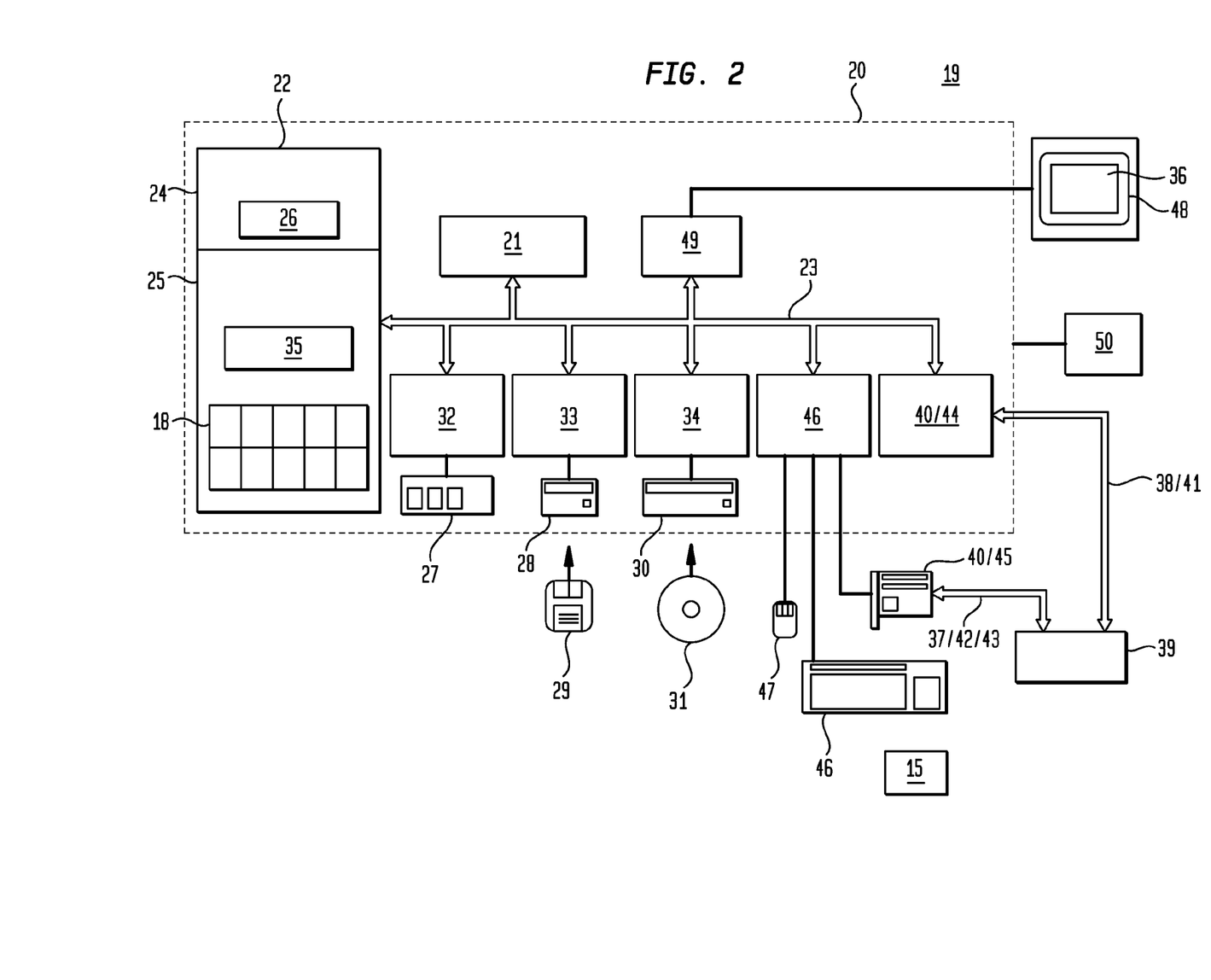
FIG. 2 is an illustration of computer hardware elements which operate to perform the method illustrated in FIG. 1.
Figure 3:
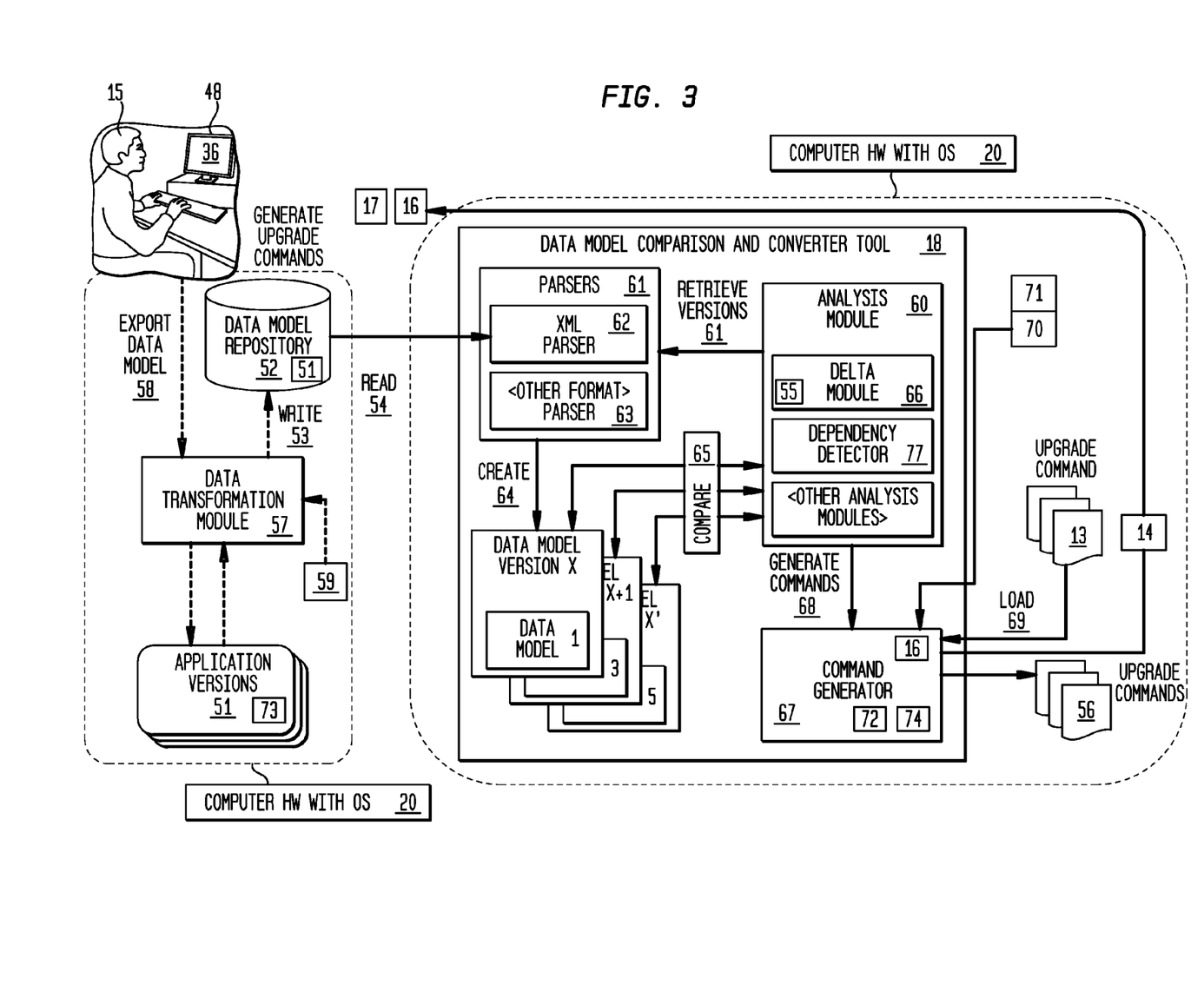
FIG. 3 is an illustration of computer software elements which operate to perform the method illustrated in FIG. 1.

Now referring primarily to FIGS. 1 and 3, while merging particular upgrade deltas (2) and customization deltas (4) can largely be automated, cases often arise that require intervention to resolve a conflict (14). These cases can be handled by configurable upgrade commands rules (13)(see the example of FIG. 2) that anticipate certain conflicts (14) or classes of conflicts and arbitrate how to resolve the conflict (14). Another way to resolve the conflict (14) can be by presentation of conflict(s) (14) to an administrator user (15) who can choose between selectable command options (16) to generate administrator upgrade commands (17) to resolve the conflict (14) (for example, which of two or more conflicting changes will be adopted).

In the subsequent step of the method, the preserved customization deltas (4) of the first bucket (9), the applicable upgrade deltas (2) of the second bucket (10), and the merge deltas (12) of the third bucket (11) can be applied to the third software data model (5) (Version X'). The result can be the target software data model (6) (Version X+1'). Understandably, the stepwise order in which the deltas (2)(5)(12) can be applied in a different order. For example, the first software data model (1) (Version X) can have the applicable upgrade deltas (2) applied to produce a second software data model (3)(Version X+1) and then the preserved customization deltas (4) can be applied to the upgraded second software data model (3), or other stepwise permutations and combinations.

Now referring primarily to FIG. 2, embodiments of the above described method can be implemented through a software data model comparator-converter program (18) run on a computer system (19). The computer system (19) can include certain network means, and computer readable media which can be utilized to practice embodiments of the invention. It is not intended that embodiments of the invention be practiced in only wide area computing environments or only in local computing environments, but rather the invention can be practiced in local computing environments or in distributed computing environments where functions or tasks are performed by remote processing devices that are linked through a communications network. In a distributed computing environment, program modules may be located in both a local or in a remote memory storage device(s) or device elements. While a preferred embodiment of the invention is described in the general context of computer-executable instructions of the software data model comparator-converter program (18) program and program modules which utilize routines, programs, objects, components, data structures, or the like, to perform particular functions or tasks or implement particular abstract data types, or the like, being executed by the computer means and network means, it is not intended that any embodiments of the invention be limited to a particular set of computer-executable instructions or protocols. As to particular embodiments, the computer system (19) can take the form of a limited-capability computer designed specifically for producing the target software model (6). The computer system (19) can include hardware such as set-top boxes, intelligent televisions connected to receive data through an entertainment medium such as a cable television network or a digital satellite broadcast, hand-held devices such as smart phones, slate or pad computers, personal digital assistants or camera/cell phone, or multiprocessor systems, microprocessor-based or programmable consumer electronics, network PCs, minicomputers, mainframe computers, or the like.

The illustrative example of a computer system (19) shown in FIG. 2 includes a first computer (20) having a processing unit (21), one or more memory elements (22), and a bus (23) (which operably couples certain components of the first computer (20), including without limitation the memory elements (22) to the processing unit (21). The processing unit (21) can comprise one central-processing unit (CPU), or a plurality of processing units which operate in parallel to process digital information. The bus (23) may be any of several types of bus configurations including a memory bus or memory controller, a peripheral bus, and a local bus using any of a variety of bus architectures. The memory element (22) can without limitation be a read only memory (ROM) (24) or a random access memory (RAM) (25), or both. A basic input/output system (BIOS)(26), containing routines that assist transfer of data between the components of the first computer (20), such as during start-up, can be stored in ROM (25). The computer (20) can further include a hard disk drive (27) for reading from and writing to a hard disk (not shown), a magnetic disk drive (28) for reading from or writing to a removable magnetic disk (29), and an optical disk drive (30) for reading from or writing to a removable optical disk (31) such as a CD ROM or other optical media. The hard disk drive (27), magnetic disk drive (28), and optical disk drive (30) can be connected to the bus (23) by a hard disk drive interface (32), a magnetic disk drive interface (33), and an optical disk drive interface (34), respectively. The drives and their associated computer-readable media provide nonvolatile storage of computer-readable instructions, data structures, program modules and other data for the first computer (20). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules may be stored on the hard disk drive (27), magnetic disk (29), optical disk (31), ROM (24), or RAM (25), including an operating system (35), one or a plurality of application programs such as the data model comparator-converter program (18) which implement a graphic user interface (36) or other program interfaces.

The first computer (20) may operate in a networked environment using one or more logical connections (37)(38) to connect to one or more remote second computers (39). These logical connections (37)(38) are achieved by one or more communication devices (40) coupled to or a part of the first computer (20) and the second computer (39); the invention is not limited to a particular type of communications device (40). The second computer (39) can be another computer, a server, a router, a network PC, a client, a peer device or other common network node, and can include a part or all of the elements above-described relative to the first computer (20). The logical connections (37)(38) depicted in FIG. 2 can include a local-area network (LAN) (41) or a wide-area network (WAN) (42). Such networking environments are commonplace in offices, enterprise-wide computer networks, intranets, wireless networks, global satellite networks, cellular phone networks and the Internet (43).

When used in a LAN-networking environment (41), the first computer (20) can be connected to the local network through a network interface or adapter (44), which is one type of communications device (40). When used in a WAN-networking environment, the first computer (20) typically includes a modem (45), a type of communications device (40), or any other type of communications device for establishing communications over the wide area network, such as the Internet (43)(shown in FIG. 1). The modem (45), which may be internal or external, is connected to the bus (23) via the serial port interface (46). In a networked environment, program modules depicted relative to the first computer (20), or portions thereof, may be as to certain embodiments of the invention stored in one or more second computers (39)(shown in the example of FIG. 2 stored in the memory (25) of the first computer (20)). It is appreciated that the network connections shown are exemplary and other means of and communications devices for establishing a communications link between the computers can be used.

The administrator user (15) may enter commands and information through input devices (46) such as a keyboard or a pointing device (47) such as a mouse; however, any method or device that converts user action into commands and information can be utilized including, but not limited to: a microphone, joystick, game pad, touch screen, or the like. A display surface (48) such as a monitor screen or other type of display device can also be connected to the bus (23) via an interface, such as a video adapter (49), or the like. The graphic user interface (36) in part can be presented on the display surface (48). In addition to the display surface (48), the first computer (20) can further include other peripheral output devices (50) such as speakers and printers; although the peripheral output devices (50) are not so limited.

Now referring primarily to FIG. 3, a plurality of software data model representations (51) for different versions of a software product can be exported, captured and stored in data model repository (52). The plurality of software data model representations (51) for a software product can in part include representations of the first software data model (1)(Version X), the second software data model (3)(Version X+1), the third software data model (5) (Version X'), and so forth) stored (53) in part of the memory (22) of the first computer (20) or the second computer (39) allocated as a data model repository (52) and can be retrieved and read (54) for analysis and upgrade to the target software data model (6). Typically, when an upgrade is performed, the software data model representations (51) are instantiated in a consistent form (for example, in-memory representations) for analysis and modification. The software data models representations (51) are then analyzed and compared (65), as above described. The comparison output can then be converted into upgrade commands (56) that can be executed to apply the desired upgrade deltas (2) or customization deltas (4) to the third software data model (5) (Version X')(or other software data model) targeted for upgrade.

As one example, a transformation module (57) can capture data model input (58) upon request from the administrator user (15) which can be in various formats (XML, SPINNER, or the like) from various sources (files, databases, or the like) and convert them to a common format and semantic data as a plurality of software data representations (51) (for example extensible markup language "XML" format) and store (53) them in the data model repository (52). As part of this step, the transformation module (57) (for example, extensible style sheet language transformations "XSLT") may be used to augment each software data model representation (51) with metadata (59) that describes the content further. The metadata (59) may come from various sources, such as reference tables or external data stores. Metadata (59) can be useful in supporting data migration later in the process.

Once data model representations (51) are in common store and format comparisons can be performed. As to one non-limiting embodiment, an analysis module (60) of the software data model comparator-converter program (18) can retrieve (61) one or more of the plurality of software data representations (51). The analysis module (61) can initiate a request to parsers (62) that retrieves (54) and reads the data model representations (51) from the data model repository (52). Depending on the data model representation format, one or more of a plurality of alternate parsers (63) may be used. As a non-limiting example, if the data (73) is in XML, an XML parser (62) can be used. If the data is in another format, one or more of a plurality of alternate parsers (63) can be used.

The parsers (61) then creates (64) an internal representation of the first software data model (1) (Version X). The parsers (61) can be directed by the analysis module (60) to retrieve (54) the second software data model (3) (Version X+1) and to create an internal representation of the second software data model (3). Yet another version could be similarly instantiated for the third software data model (5). With the data models for the different versions instantiated, the analysis module (60) can direct comparisons between them.

As to the example of FIG. 3, a comparison request (65) can be issued by the analysis module (60) to retrieve (61) the first software data model (1)(Version X)(or internal representation). Then another comparison request (65) can be issued by the analysis module (60) to retrieve the second software data model (3)(Version X+1). Then another comparison request (65) can be issued to retrieve (61) the third data model (5) (Version X')(or internal representation), and so forth. The analysis module (60) can then invoke a delta module (66) to perform a comparison of the first software data model (1) (Version X) and the third software data model (5)(Version X') and the first software data model (1)(Version X) with the second software data model (3)(Version X+1), as above described. In another embodiment, the first software data model (1)(Version X) or the third software data model (5) (Version X') (or other data model) can perform the comparison between itself and the other data model directly and then return the result. In performing an upgrade on a third software data model (5)(Version X') including customized deltas (4), the multiple analysis steps above described can be performed by the delta module (66) to determine upgrade deltas (2), customization deltas (4) and merge deltas (12).

The analysis module (60) can forward the returned customization deltas (4) and upgrade deltas (2) to a command generator (67). The analysis module (60) can further make a command generation request (68) generation of upgrade commands (56) based on the forwarded returned deltas (2)(4)(12) and upgrade commands rules (13) that have been loaded (69) into the command generator (67). The upgrade commands rules (13) direct the command generator (67) to produce specific upgrade commands (56) based on conditions or types of changes represented by the returned deltas (2)(4)(12). This allows the administrator user (15) to direct command generation according to preferences. As one non-limiting example, the administrator user (15) can specify arbitration rules (70) for specific merge conditions (71) that would otherwise require the administrator user (15) to intervene to resolve the conflicts. If no upgrade commands rules (13) are provided, the command generator (67) can include a set of built-in default rules (72) that can be applied.

After the target software data model (6)(Version X+1') has been achieved, the resulting analysis can be further applied to migration of data (73) to ensure alignment with the created target software data model (6) (Version X+1'). The data (73) migration can be based first on the changes made to the first software data model (1) (Version X) or to the third software data model (5)(Version X'). Secondly, data (73) can be changed based on designated migration rules (74) corresponding to the nature of the returned deltas (2)(4)(12). If rules cannot be inferred, the administrator user (15) can be given an option to provide (or override) upgrade commands (56). Changes that have been detected in the first software data model (1) (Version X) or the third software data model (5) (Version X') can then be applied to the data (73) to ensure consistency with the target software data model (6) (Version X+1').

Accordingly, the instant invention applies not only to returned deltas (2)(4)(12) relating to the first software data model (1)(Version X) or the third software data model (5) (Version X') but also to any data (73) affected by those returned deltas (2)(4)(12). If the first software data model (1)(Version X) has been customized, then most likely data (73) based on third software data model (5)(Version X') has been instantiated. Upgrade deltas (2) affecting the third software data model (5)(Version X') can also be applied to the data (73). This invention covers this by generating upgrade commands (56) that not only update the third software data model (5)(Version X'), but also peruse and update the actual data (73) for affected types, relationships, and the like. Every affected aspect of the data (73) can be updated.

As a non-limiting example, a first software data model (1) (Version X) can be upgraded to a second software data model (3) (Version X+1) resulting in the addition of an attribute Z to a type Q. Consider also, that attribute Z is an enumerated type with predefined values, with default value A. A third software data model (5) (version X') has also been created with the addition of a new value, H, to the set of enumerated set of attribute Z values. Furthermore, H has also been assigned as the default for all new instances of attribute Z. The command generator (67) would, as a result of these conditions, generate upgrade commands (56) to not only upgrade type Q with the attribute Z, but to also upgrade corresponding instances of type Q in the data. The upgrade commands (56) would be generated to find all instances of type Q in the data model repository (52), add a new instance of attribute Z to each one, and set the default value for that attribute Z to H (the custom default) not A (the default originally established by the upgrade).

Figure 4:
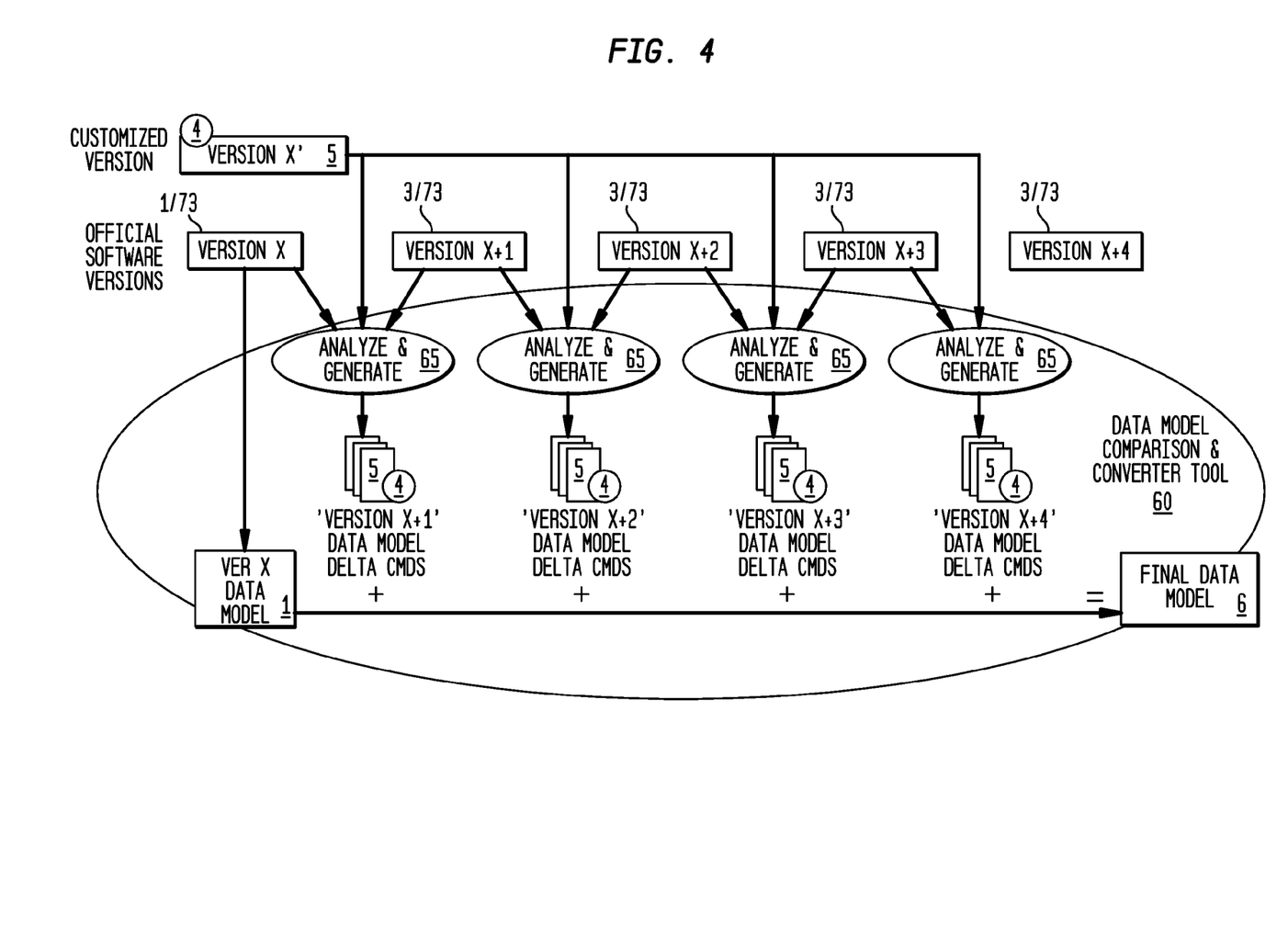
FIG. 4 is an illustration of a particular method of upgrading across a plurality of versions of a customized software data model to provide a target software data model.

Now referring primarily to FIG. 4, software data model comparator-converter program (18) can be used to perform an upgrade on a third software data model (5) containing customization deltas (4) using a second software data model (3) in the form of a series of second software data models (Version X+1, X+2, X+3, X+4, X+5 . . . ) each having incremental upgrade deltas (2).

Returned first data model deltas (7) and second data model deltas (8) can be generated as the output of comparisons done among each pair of incremental versions of a first software data model (1)(Version X, X+1, X+2 . . . ) and of incremental versions of a second software data model (3) (Version X+1, X+2, X+3 . . . ) and the incrementally created versions of the third software data model (5) including customization deltas (4)(Version X', X+1', X+2' . . . ). The returned data model deltas (7)(8) can then be executed serially as upgrade commands (56) to create sequential versions of the target software data model (6) and to allow data migration of data (73) to the latest version of the target software data model (6) as shown in example of FIG. 4. This procedure can be applied from whichever software data model version an administrator user's (15) installation begins with. For example, for an administrator user (15) with a deployed first software data model (1)(Version X+2) in the form of a third software data model (5) (X+2') only the upgrade commands (56) generated from the comparisons among the version set {X+2', X+2, X+3} and the comparisons among versions {X+3', X+3, X+4} need be applied, where X+3' is the result of comparing {X+2', X+2, X+3} and applying the resulting first data model deltas (7) and second data model deltas (8).

Figure 5:
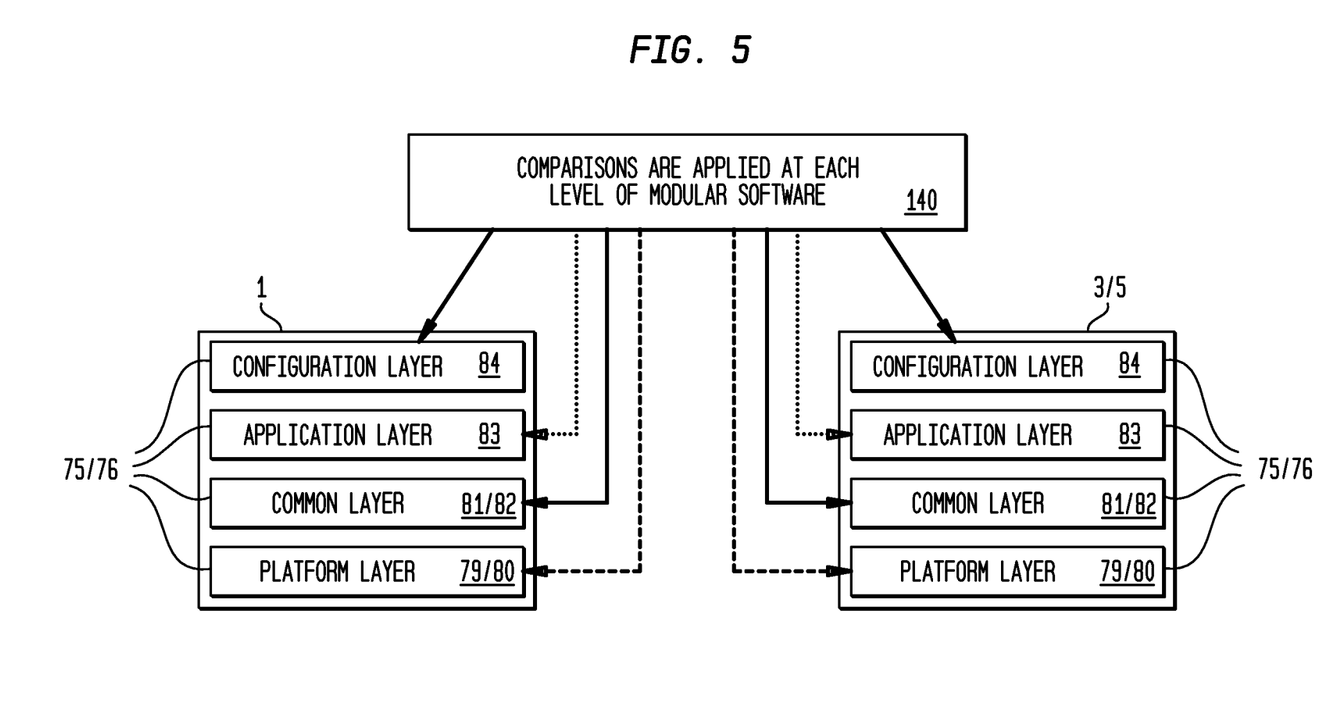
FIG. 5 is an illustration of a particular method of upgrading across a plurality of separate layers of a customized software data model.
Figure 6:
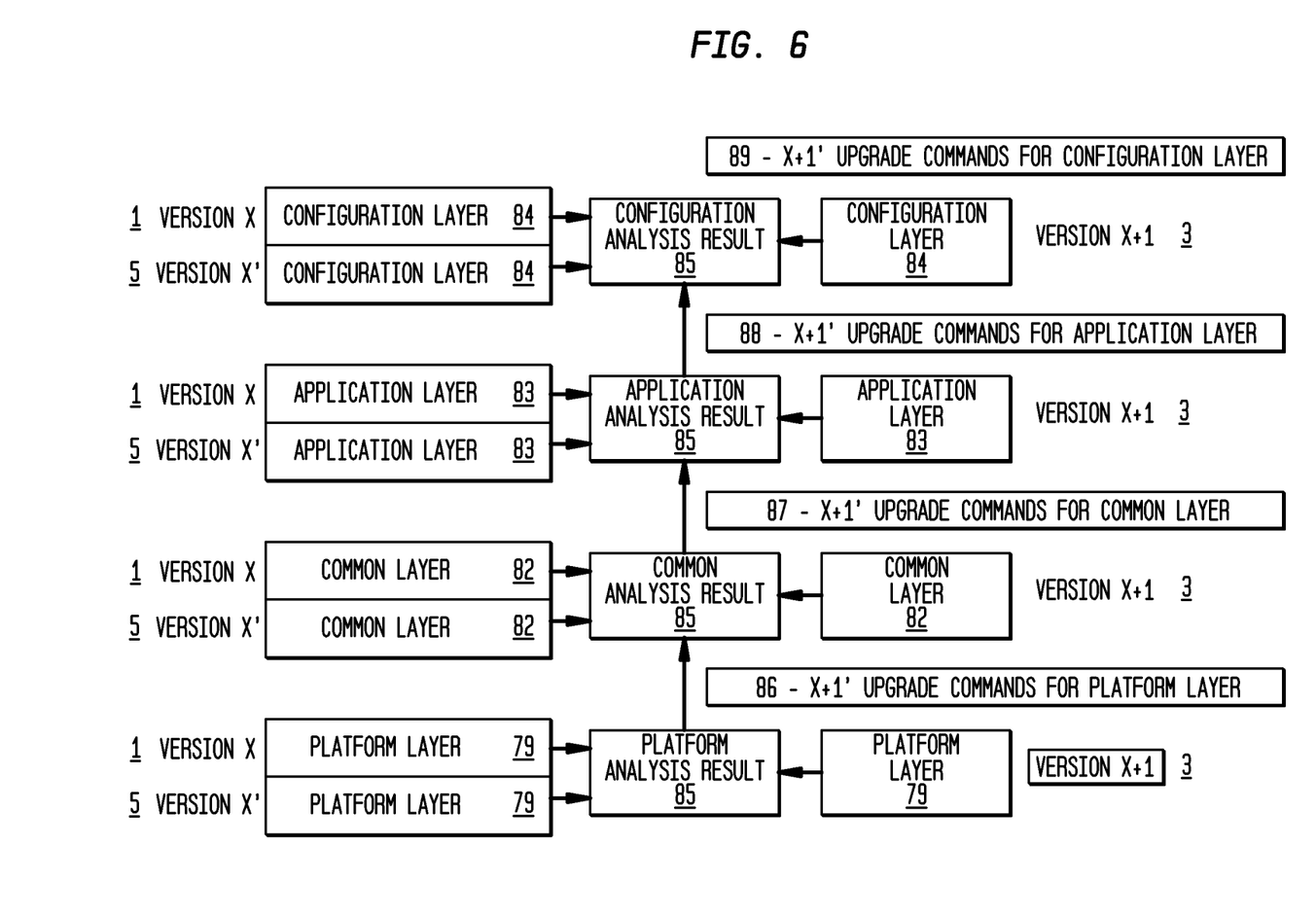
FIG. 6 is an illustration of a particular method of upgrading across a plurality of separate layers of a customized data model including the analysis of changes that have already been performed in dependent layers.

Now referring primarily to FIGS. 5 and 6, the method can also be applied to discrete layers of a first software data model (1). Often times, the first software data model (1) will consist of a plurality of separate layers (75)(or portions) contributed and designed by separate organizations or provided by separate application modules (76). Since they are managed separately in their development, it can be expedient to likewise analyze and provide upgrade commands (56) for these portions of the first software data model (1) separately, as above described. This means that as the plurality of separate layers (75) of the data first software data model (225) are tracked, the analysis and upgrade commands (56) of the method can be done individually for each of the plurality of separate layers (75). Accordingly, upgrade commands (56) that apply only to one or more of the plurality of separate layers (75) of the first software data model (1) can be performed in an upgrade incrementally without affecting the other portions of the first software data model (1).

The general approach taken in this method can further include a dependency detector (77) shown in the example of FIG. 3 to identify dependent elements (78) in upper layers affected by changes made in lower layers of first software data model (1) (Version X) and the corresponding second software data model (3) (Version X+1) and the third software data model (5) (Version X'). At a minimum, these dependent elements (78) can be detected through operation of the analysis module (60) in an incremental manner in comparison of the first, second, and third software data models (1)(3)(5). The analysis module (60) can operation to perform comparisons (65) and the command generator (67) can function to generate upgrade commands (56) beginning at a first layer (79) (for example a platform layer (80) of the plurality of separate layers (75) of the software data models). Typically, once that is completed, comparison (65) by the analysis module (60) and generation of upgrade commands (56) by the command generator (67) commence at the next higher second layer (81) (for example the common layer (82)) of the plurality of layers (75) of the software data models).

As above described, comparisons (65) involve two different versions of the data model (such as the first software data model (1)(Version X) and the second software data model (3)(Version X+1) including upgrade deltas (2) and between the first software data model (1) (Version X) and the third software data model (5) including customization deltas (4)) at a first layer (79) of the plurality of separate layers (75) of the data model. However, in this layered approach, analysis at each one of the plurality of separate layers (75) (for example, the configuration layer (84) the application layer (83)) must also incorporate any dependencies resulting from changes in the layer(s) below (for example, the common layer (82) and the platform layer (80)).

Now referring to FIG. 6, upgrade commands (56) (which include commands for data migration) performed at any first layer (79) or portion of the first software data model (5) hinges on analyzing changes that have already been performed in dependent layers. The Figure shows the respective analysis result (85) at each one of the plurality of separate layers (75) (80)(82)(83)(84). Furthermore, each discrete analysis result (85) for each one of the plurality of separate layers (75) can be converted to corresponding discrete upgrade commands (86)(87)(88)(89) by which an updated data model and migrated data can be realized for each respective layer (80)(82)(83)(84). For example, the analysis result (85) at the common layer (82) hinges on:

the common layer (82) Version X data model (1),
the common layer (82) Version X' data model (5),
the common layer (2) Version X+1 data model (2), and
the analysis result (85) of the platform layer (79) of the X+1' (5) platform Layer data model result (85) and its corresponding X+1' upgrade commands (86) for the platform layer (79).

At the common layer (82), the analysis result (85) and its associated upgrade commands (87) for the common layer (82) can be invoked to update the common layer (82) to achieve a target model (6) (Version X+1') having an upgraded common layer (82). The per-layer analysis result (85) (and/or the resulting target model (6) having a Version X+1' layer) can then be used in analyzing dependent elements (78) in the above layers.

Figure 7:
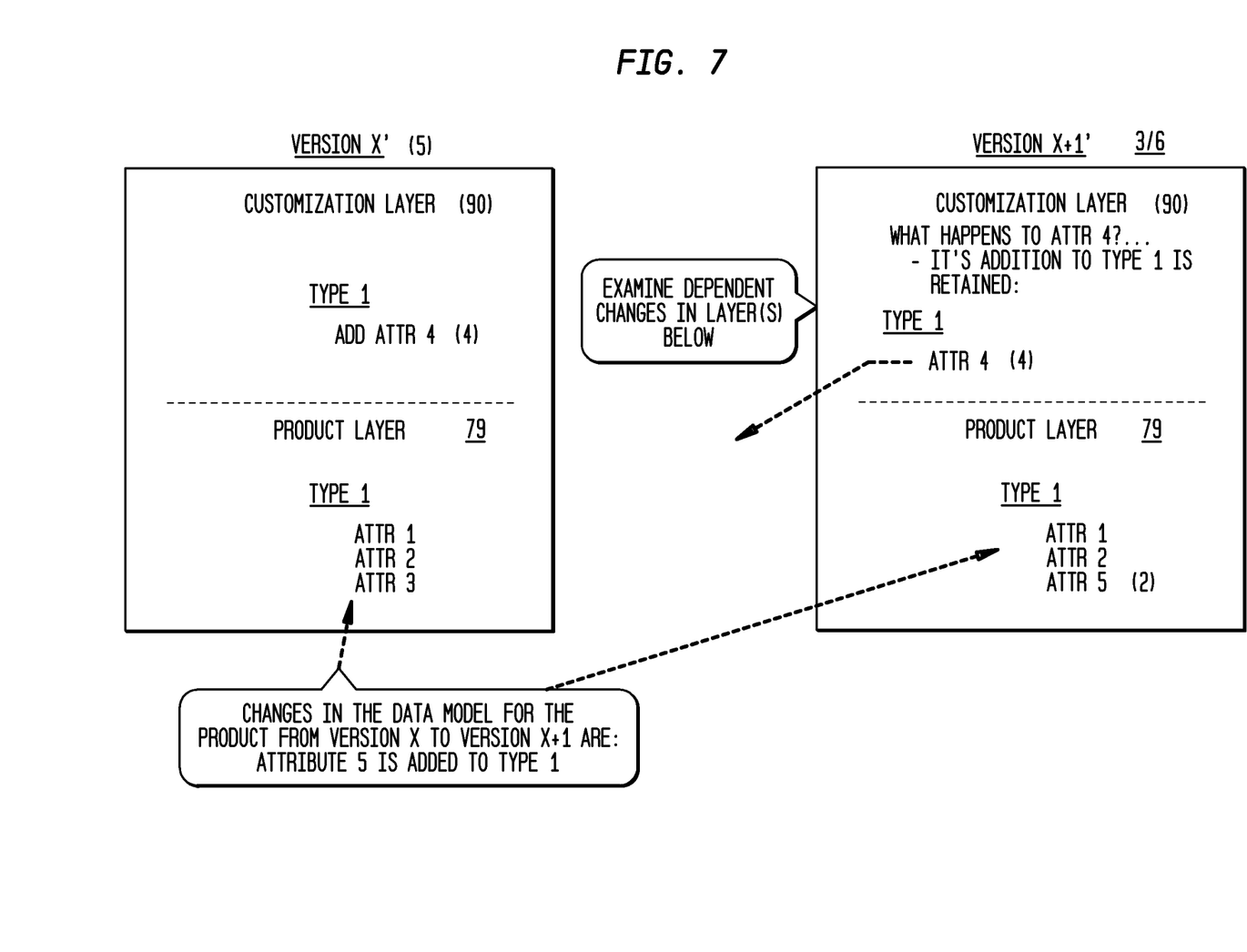
FIG. 7 is an illustration of a non-limiting example of an upgrade to a layered customized software data model.

Now referring to FIG. 7, which provides an illustrative example of an upgrade in a customization layer (90) applied to a first layer (79) of first software data model (1) (Version X)

to generate a third software data model (5) having customization deltas (4). In the third software data model (5) customization delta (4) (Attribute 4) has been added to the first software data model (1). At the first layer (79), the first software data model (1) (Version X) is upgraded to a second software data model (3)(Version X+1) in that Attribute 5 is added to Type 1. Upon upgrade command (56) (see FIG. 3), the impact on the customization layer (90) including the customization delta (4) (Attribute 4 to Type 1) may be none and the customization delta (4) (Attribute 4) is retained and continues to be included with Type 1. However, it may be that the customization delta (4)(Attribute 4) is a semantically the same as the upgrade delta (2)(Attribute 5) of the second software data model (3). While the method (or data model comparator-converter program (18) implementing the method) retains the customization delta (4)(Attribute 4), it can also flag this situation as a case to be reviewed by the administrator user (15) to ensure no semantic duplication.

If Type 1 in the first software data model (1) (Version X) had not been altered in any way, no assessment of the customized delta (4) in the third software data model (3) (Attribute 4) would have been necessary. However, since Type 1 is changed by the upgrade delta (2) in the second software data model (3)(Version X+1) by adding the upgrade delta (2)(Attribute 5), the dependency can be flagged and an analysis of the customization delta (4) to Type 1 by addition of Attribute 4 can be made.

Figure 8:
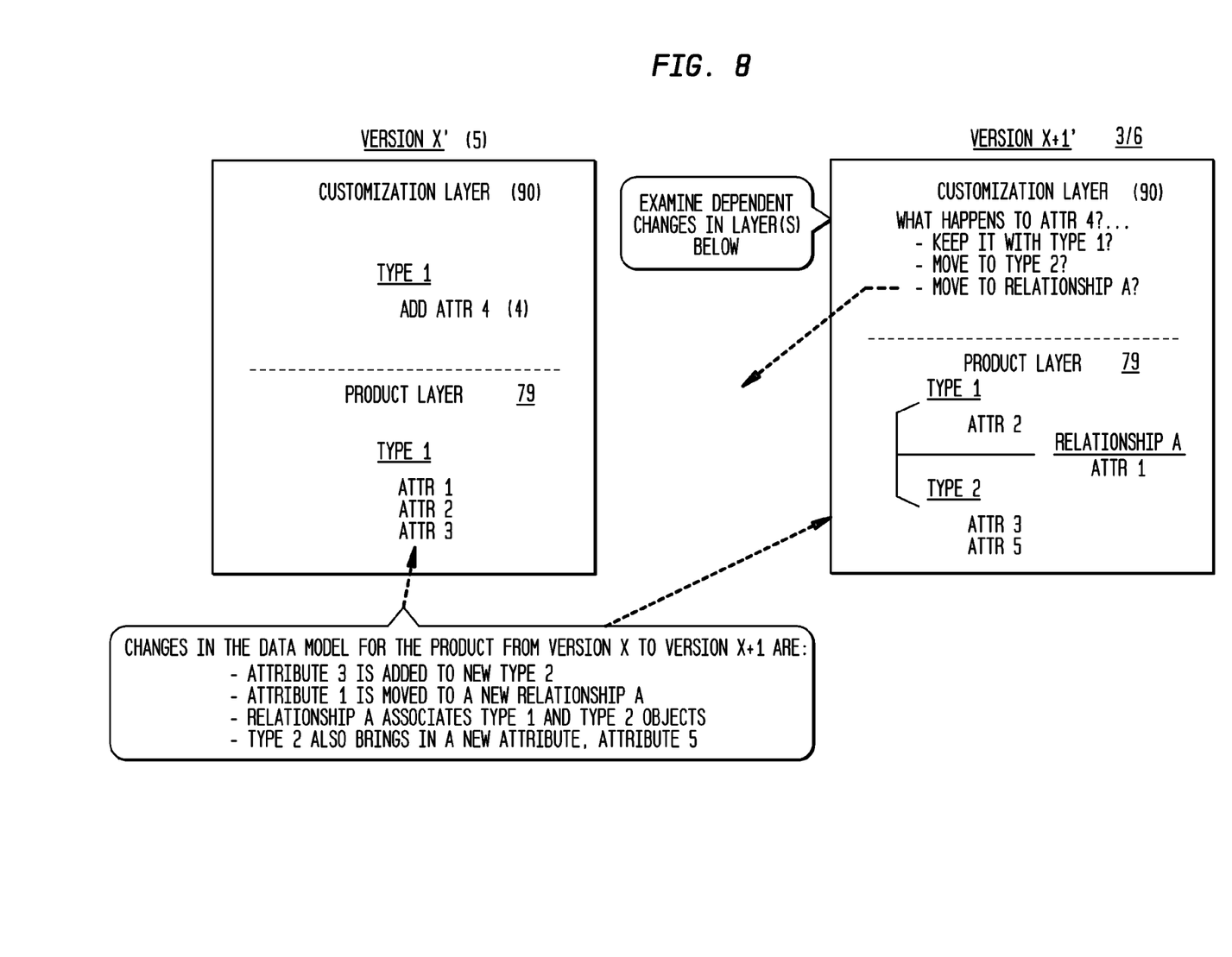
FIG. 8 is an illustration of a second non-limiting example of an upgrade to a layered customized software data model.

Now referring to the example shown in FIG. 8, which provides an illustrative example of an upgrade in a customization layer (90) applied to a first layer (79) of first software data model (1) (Version X) to generate a third software data model (5) having customization deltas (4). In the upgrade deltas (2) of a second software data model (3) Type 1 is now related to a new type, Type 2, via a new Relationship, A. Furthermore, Attribute 1 is now associated with Relationship A (rather than Type 1) and Attribute 3 is now associated with Type 2 (rather than Type 1).

In this case, in view of the returned deltas (7)(8) there are several possible outcomes with respect to Attribute 4 within the customization layer (90) of the third software data model (5), including: retain Attribute 4 with Type 1, move Attribute 4 to Type 2, move Attribute 4 to Relationship A, or update Attribute 4 in accordance with administrator upgrade commands (17).

To handle this situation the method (or data model comparator-converter program (18) that embodies the method) can act on the basis of upgrade command rules (13) (or policies) that have been defined to flag this situation and perform one of the possible functions. For example, upgrade command rules (13) may dictate that any Types for which attributes were changed to a Relationship should have all customized attribute additions also moved to that relationship. If no upgrade command rules (13) were defined for this situation, then the situation can be brought to the attention of the administrator (15) to resolve the conflict according to one of the command options (16) which list the above options.

Figure 9:
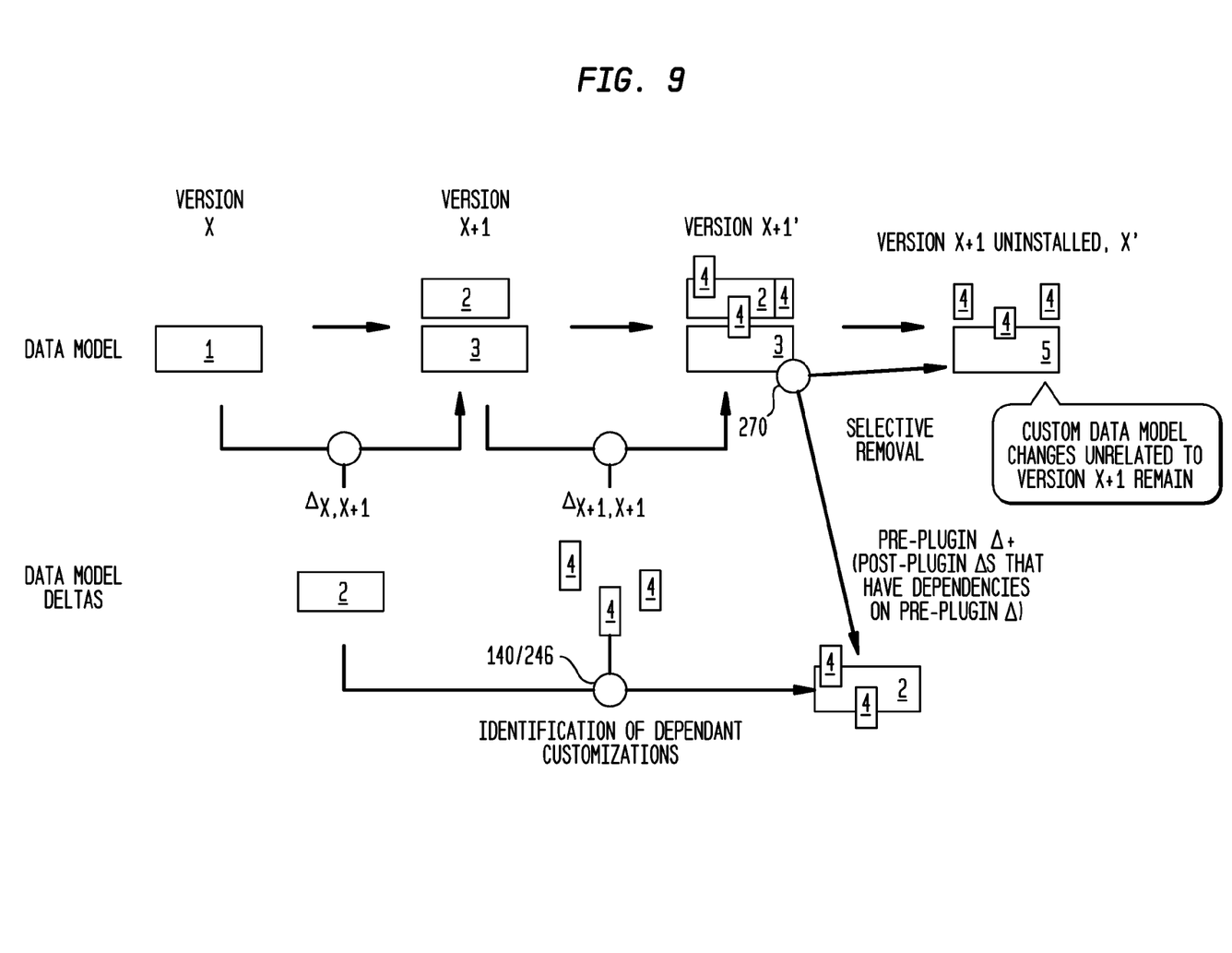
FIG. 9 is an illustration of a particular embodiment of method of FIG. 1 to uninstall an upgrade to a customized software data model using the computer hardware and software illustrated in FIGS. 2 and 3.

Now referring primarily to FIG. 9, which illustrates a method for uninstalling upgrade deltas (2) even after the addition of customization deltas (4) to a second data model (3) having upgrade deltas (2). As an example, in which the administrator user (15) has upgraded a first software data model (1) (Version X) to a second software data model (3) (Version X+1) having upgrade delta (2). Thereafter, customization deltas (4) added to the second software data model (3) produce a third software data model (5)(Version X+1') including customization deltas (4). The customization deltas (4) made can impact upgrade deltas (2) introduced by the second software data model (3)(Version X+1). At this stage, the administrator user (15) decides to uninstall the upgrade deltas (2) of the second software data model (3)(Version X+1).

Typically, this circumstance is not addressed, or is ineffectively addressed by conventional tools by way of two approaches. The first conventional approach can be to take a snapshot of the first data model (1) and data (73) prior to adding upgrade deltas (2). To reverse the upgrade deltas (2), revert to the snapshot of the first data model (1) and data (73). The disadvantage of this approach can be that any customization deltas (4) or additional upgrade deltas (2) made in the interim are lost. The second approach can be to make changes directly manually. The disadvantage to this can be that it is typically a costly and time-consuming endeavor.

In contrast, the data model comparator-converter program (18) and method can be applied to this situation to uninstall upgrade deltas (2) despite customization deltas (4) that have been made. In doing so, the time and cost to uninstall the upgrade deltas (2) can be significantly reduced while retaining all customization deltas (4).

As shown in FIG. 9, the following steps provide a non-limiting example of how the data model comparator-converter program (18) and method similar to that above described operates to uninstall upgrade deltas (2) even when customization deltas (4) have been made to the second software data model (3) including upgrade deltas (2). A comparison can be made between the first software data model (1) (Version X) and the second software data model (3) (Version X+1) including upgrade deltas (2), and the third software data model (5) (Version X+1') including customization deltas (4). In a subsequent step, analysis and determination of customization deltas (4) and upgrade deltas (2) ($\Delta_{X, X+1}$ and $\Delta_{X+1, X+1'}$) can be achieved to determine which customizations deltas (4), if any, are dependent on the second software data model (3)(Version X+1) upgrade deltas (2), if any. These customization deltas (4) will no longer apply once $\Delta_{X, X+1}$ has been removed. These dependent changes, along with $\Delta_{X, X+1}$ comprise the customization deltas (4) that must be removed from the target software data model (6) to uninstall the second software data model (3) (Version X+1) correctly. With this analysis complete, the command generator (67) produces the upgrade commands (56) necessary to not only remove the $\Delta X$, X+1 changes of the second software data model (3) (Version X+1), but also those customization deltas (4) dependent on it. As with other analysis noted above, if an ambiguous situation arises with no corresponding command rules (56) (or policies) to disambiguate them, the administrator user (15) is notified of the situation so it can be resolved. With the selective removal applied, the third software data model (5) acted on can be brought back to the first software data model (1)(Version X), with applicable customizations deltas (4) remaining to provide the corresponding third software data model (5) of Version X (or Version X').

As can be easily understood from the foregoing, the basic concepts of the present invention may be embodied in a variety of ways. The invention involves numerous and varied embodiments of an automated system for upgrading a data model and data including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "an upgrade" should be understood to encompass disclosure of the act of "upgrading"—whether explicitly discussed or not—and, conversely, were there effectively disclosure of the act of "upgrading", such a disclosure should be understood to encompass disclosure of "an upgrade" and even a "means for upgrading." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a software data model" refers to one or more of those software data models. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus, the applicant(s) should be understood to claim at least: i) each automated software upgrade device herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A computer system for upgrading a software data model and data, comprising:
 a processing unit in communication with a memory element, said memory element containing a software data model repository which stores a plurality of software data models and a software data model comparator which compares:
  a first software data model;
  a second software data model, said second software data model comprising an upgrade delta applied to said first software data model; and
  a third software data model, said third software data model comprising a customization delta applied to said first software data model, said customization delta including schema differences not included in said first software data model and said second software data model, said second software data model applied to said third software data model upon installation results in loss of said customization delta;
 a delta module which returns:
  upgrade deltas based on comparison of said second software data model to said first software data model; and
  customization deltas based on comparison of said third software data model to said first software data model; and
 a command generator which generates upgrade commands applied to said first software data model to produce a target software data model which includes said upgrade deltas and said customization deltas.

2. The computer system of claim 1, wherein said delta module further returns merged deltas relating to conflicts between said upgrade deltas and said customization deltas.

3. The computer system of claim 2, wherein said command generator further generates command rules applied to said merged deltas to resolve conflicts between said upgrade deltas and said customization deltas.

4. The computer system of claim 3, wherein said command generator further generates command options selectable to apply one or more administrator command rules to said merged deltas to resolve conflicts between said upgrade deltas and said customization deltas.

5. The computer system of claim 4, wherein said command generator further generates migration rules to allow data to migrate from said first software data model to said target software data model.

6. The computer system of claim 1, wherein said software data model comparator further compares:
each incremental pair of said first software data model and said second software data model across a series of software data models; and
each incremental pair of said first software data model and said third software data model across said series of software data models.

7. The computer system of claim 6, wherein said delta module serially returns said upgrade deltas, said customization deltas, and merged deltas for each incremental pair across said series of software data models.

8. The computer system of claim 7, wherein said command generator applies said upgrade commands based on said returned upgrade deltas, said returned customization deltas, and said returned merged deltas for each incremental pair across said series of software data models to generate serially said target software data model to serially produce said target software data model.

9. The computer system of claim 1, wherein said software data model comparator further discretely compares a first layer of a plurality of separate layers between each of said first software data model, said second software data model, and said third software data model to return said upgrade deltas, said customization deltas, and said merged deltas for said first layer of said plurality of separate layers.

10. The computer system of claim 9, wherein said command generator further generates upgrade commands based on mapping rules of said upgrade deltas, said customization deltas, and said merged deltas of said first layer of said plurality of separate layers.

11. The computer system of claim 10, wherein said command generator further generates upgrade commands to produce a target software data model including said upgrade deltas and said customization deltas for said first layer of said plurality of separate layers without affecting a second layer of said plurality of separate layers.

12. The computer system of claim 11, further comprising a dependency detector which detects one or more dependent elements of said second layer of said plurality of separate layers based on changes made in said first layer of said plurality of separate layers.

13. The computer system of claim 1, wherein said software data model comparator further uninstalls said upgrade deltas from said target software data model including said customization deltas.

14. The computer system of claim 1, wherein said software data model comparator further uninstalls said upgrade deltas from said target software data model while retaining said customization deltas.

* * * * *